(12) United States Patent
Kwon et al.

(10) Patent No.: US 8,274,922 B2
(45) Date of Patent: Sep. 25, 2012

(54) APPARATUS AND METHOD FOR TRANSMITTING DATA AND APPARATUS AND METHOD FOR RECEIVING DATA

(75) Inventors: Chang-Yeul Kwon, Yongin-si (KR); Seong-Soo Kim, Seoul (KR); Guoping Fan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 12/392,307

(22) Filed: Feb. 25, 2009

(65) Prior Publication Data

US 2009/0201827 A1 Aug. 13, 2009

Related U.S. Application Data

(63) Continuation of application No. PCT/KR2007/004091, filed on Aug. 24, 2007.

(60) Provisional application No. 60/840,036, filed on Aug. 25, 2006.

(30) Foreign Application Priority Data

Aug. 21, 2007 (KR) .......................... 10-2007-0083901

(51) Int. Cl.
*H04B 7/005* (2006.01)
*H04B 7/212* (2006.01)

(52) U.S. Cl. ....................................... 370/278; 370/444

(58) Field of Classification Search .................. 370/252, 370/254, 278–282, 389, 392, 395.4, 395.42, 370/395.43, 444
See application file for complete search history.

(56) References Cited

U.S. PATENT DOCUMENTS

| | | | | |
|---|---|---|---|---|
| 5,394,433 A | * | 2/1995 | Bantz et al. | 375/132 |
| 5,434,848 A | * | 7/1995 | Chimento et al. | 370/232 |
| 6,052,594 A | * | 4/2000 | Chuang et al. | 455/450 |
| 6,148,357 A | | 11/2000 | Gulick et al. | |
| 6,407,998 B1 | * | 6/2002 | Polit et al. | 370/365 |
| 6,728,834 B2 | | 4/2004 | Stone et al. | |
| 6,922,396 B1 | | 7/2005 | Knappe | |
| 6,987,728 B2 | * | 1/2006 | Deshpande | 370/229 |
| 2002/0126698 A1 | * | 9/2002 | Deshpande | 370/467 |
| 2003/0103524 A1 | * | 6/2003 | Hasegawa | 370/465 |
| 2006/0198301 A1 | * | 9/2006 | Airy et al. | 370/229 |
| 2007/0076604 A1 | * | 4/2007 | Litwack | 370/230 |

\* cited by examiner

*Primary Examiner* — Hong Cho
(74) *Attorney, Agent, or Firm* — Sughrue Mion, PLLC

(57) ABSTRACT

Provided are a apparatus and method for transmitting data and a apparatus and method for receiving data, in which a transmitting station sets priorities among a plurality of data to be transmitted and a receiving station processes the plurality of data according to the priorities. The apparatus for transmitting data includes a packet-generation module which generates a plurality of data and a packet that includes the plurality of data and that specifies priorities between the plurality of data; and a communication module which transmits the packet through a communication channel.

25 Claims, 14 Drawing Sheets

| HRP MODE INDEX | CODING MODE | MODULATION | CODE RATE | | RAW DATA RATE (Gb/s) |
|---|---|---|---|---|---|
| | | | MSB [7][6][5][4] | LSB [3][2][1][0] | |
| 0 | EEP | QPSK | 1/3 | | 0.940 |
| 1 | EEP | QPSK | 2/3 | | 1.881 |
| 2 | EEP | 16-QAM | 2/3 | | 3.761 |
| 3 | UEP | QPSK | 4/7 | 4/5 | 1.881 |
| 4 | UEP | 16-QAM | 4/7 | 4/5 | 3.761 |
| 5 | MSB-only retransmission | QPSK | 1/3 | N/A | 0.940 |
| 6 | MSB-only retransmission | 16-QAM | 1/3 | N/A | 1.881 |

| PACKET CLASS FIELD | PACKET CLASS |
|---|---|
| 0b000 | NORMAL |
| 0b001 | COMPOSITE |
| 0b010 | Omni ACK |
| 0b011 | BEACON |
| 0b100 – 0b111 | RESERVED |

| ACK POLICY FIELD | ACK POLICY |
|---|---|
| 0b00 | no-ACK |
| 0b01 | Imm-ACK |
| 0b10 – 0b11 | RESERVED |

APPARATUS AND METHOD FOR TRANSMITTING DATA AND APPARATUS AND METHOD FOR RECEIVING DATA

CROSS-REFERENCE TO RELATED APPLICATION

This is a Continuation Application of International Application PCT/KR2007/004091, with an international filing date of Aug. 24, 2007, the disclosure of which is incorporated herein by reference. This application claims priority from U.S. Provisional Application No. 60/840,036 filed on Aug. 25, 2006 and Korean Patent Application No. 10-2007-0083901 filed on Aug. 21, 2007 in the Korean Intellectual Property Office, the disclosures of which are incorporated herein by reference in their entirety.

BACKGROUND OF THE INVENTION

1. Field of the Invention

Apparatuses and methods consistent with the present invention relate to transmitting and receiving data in a wireless network system, and, more particularly, to a wireless network system, in which a transmitting station sets priorities among a plurality of data to be transmitted and a receiving station processes the plurality of data according to the priorities.

2. Description of the Related Art

FIG. 1 is a view illustrating the structure of a related art superframe. As illustrated in FIG. 1, the related art superframe 100 is composed of a beacon period 110 appearing in the starting portion thereof, a Contention Access Period (CAP) 120, and Channel Time Allocation Period (CTAP) 130. During the CAP 120, asynchronous data, control commands, or the like can be transmitted or received. The CTAP 130 consists of a plurality of blocks of Management Channel Time Allocation (MCTA) 131 and a plurality of blocks of Channel Time Allocation (CTA) 132. Control commands, isochronous data, asynchronous, or the like can be transmitted or received through the CTA 132.

The length of the CAP 120 is determined by an Access Point (AP), and transmitted to stations participating in a network through a beacon frame distributed in the beacon period 110.

Carrier Sense Multiple Access with Collision Avoidance (CSMA/CA) is used in the CAP 120 for media access. In contrast, Time Division Multiple Access (TDMA) during which each wireless network station has a specific time window is used in the CTAP 130. An AP allocates a channel time to a device requesting media access, and performs transmission or reception of data with a corresponding wireless network station during the allocated channel time. Here, the MCTA 131 is assigned to a pair of wireless network stations attempting to exchange data, so that it performs media access through a TDMA media access, or is used as a shared CTA using the slotted Aloha protocol.

There are two data transmission schemes: a compressed data transmission mode; and an uncompressed data transmission scheme. In the first transmission mode, compressed data is transmitted through a bandwidth of several gigabytes. In the latter transmission mode, uncompressed data is transmitted through a bandwidth of several tens of gigabytes. The uncompressed data, which is larger than the compressed data, can be transmitted through a bandwidth of several tens of gigabytes. Uncompressed data is less vulnerable to packet loss occurring during data transmission than in the case of compressed data.

Data to be transmitted can be classified as data that must be immediately processed by a receiving station and data that does not need to be processed immediately by the receiving station. For example, the processing of video data and audio data may have priority over the processing of Internet data such as File Transfer Protocol (FTP) and Hypertext Transfer Protocol (HTTP) data.

Therefore, it is necessary to develop a technique of processing a plurality of data received by a receiving station according to priorities set among the plurality of data.

SUMMARY OF THE INVENTION

The present invention provides methods and apparatuses for enabling a transmitting station to set priorities among a plurality of data to be transmitted and enabling a receiving station to process the plurality of data according to the priorities.

According to an aspect of the present invention, there is provided an apparatus for transmitting data, the apparatus including: a packet-generation module which generates a plurality of data and a packet that includes the plurality of data and that specifies priorities between the plurality of data; and a communication module which transmits the packet through a communication channel.

According to another aspect of the present invention, there is provided an apparatus for receiving data, the apparatus including: a communication module which receives a packet through a communication channel; a packet-analysis module which identifies priorities among a plurality of data included in the packet; and a central processing unit (CPU) which processes the plurality of data according to the identified priorities.

According to another aspect of the present invention, there is provided a method of transmitting data, the method including: generating a plurality of data and a packet that includes the plurality of data and that specifies priorities between the plurality of data; and transmitting the packet through a communication channel.

According to another aspect of the present invention, there is provided a method of receiving data, the method including: receiving a packet through a communication channel; identifying priorities among a plurality of data included in the packet; and processing the plurality of data according to the identified priorities.

BRIEF DESCRIPTION OF THE DRAWINGS

The above and other aspects of the present invention will become more apparent by describing in detail exemplary embodiments thereof with reference to the attached drawings, in which:

FIG. 12 illustrates a table showing various types of packet classes that can be specified in a packet class field illustrated in FIG. 11;

FIG. 13 illustrates a table showing various types of acknowledgement (ACK) policies that can be specified in an ACK policy field illustrated in FIG. 11;

DETAILED DESCRIPTION OF EXEMPLARY EMBODIMENTS OF THE INVENTION

Figure 1:
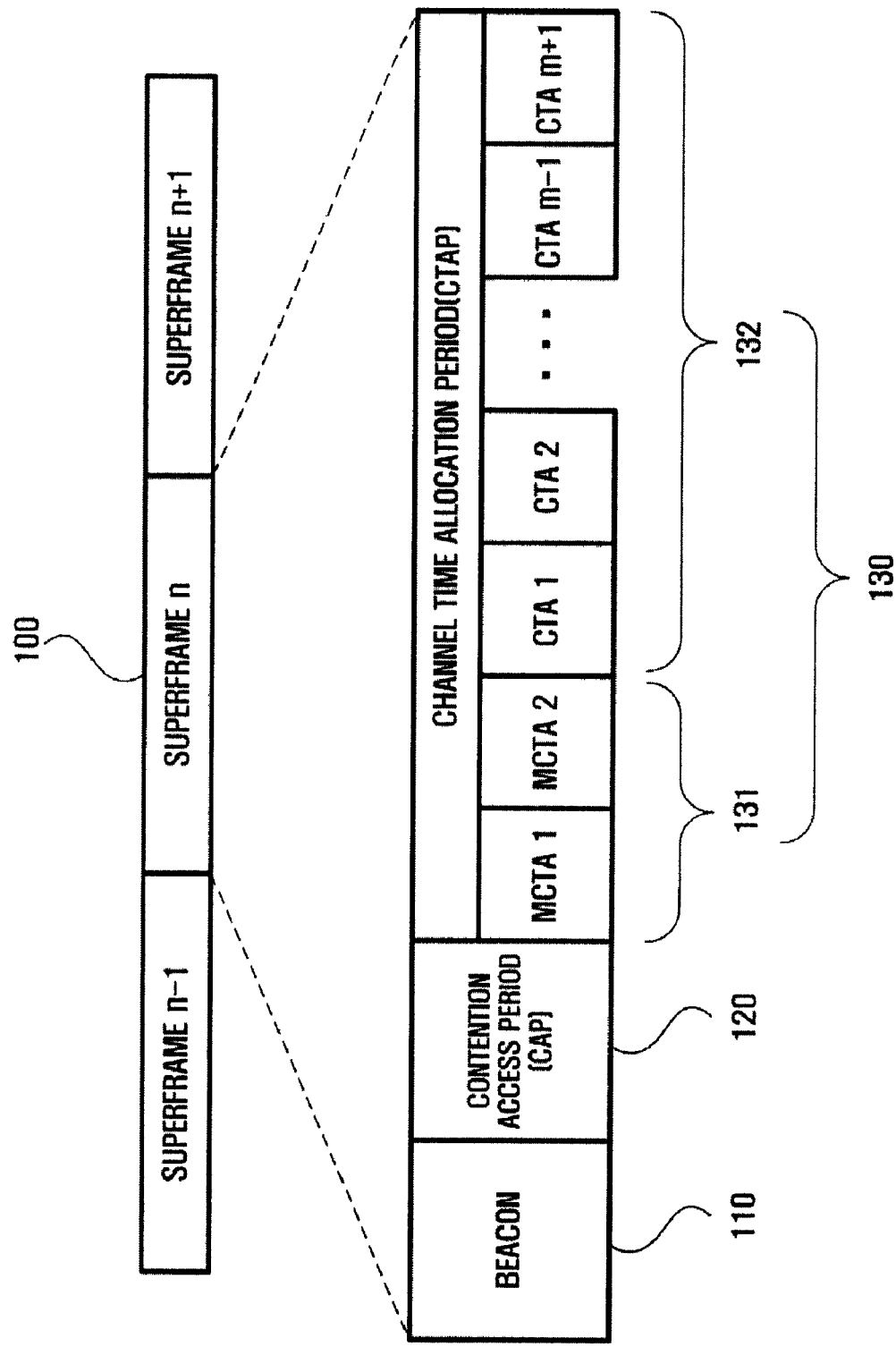
FIG. 1 illustrates a related art super frame.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, an exemplary embodiment of the present invention will be described in detail with reference to the accompanying drawings.

Figure 2:
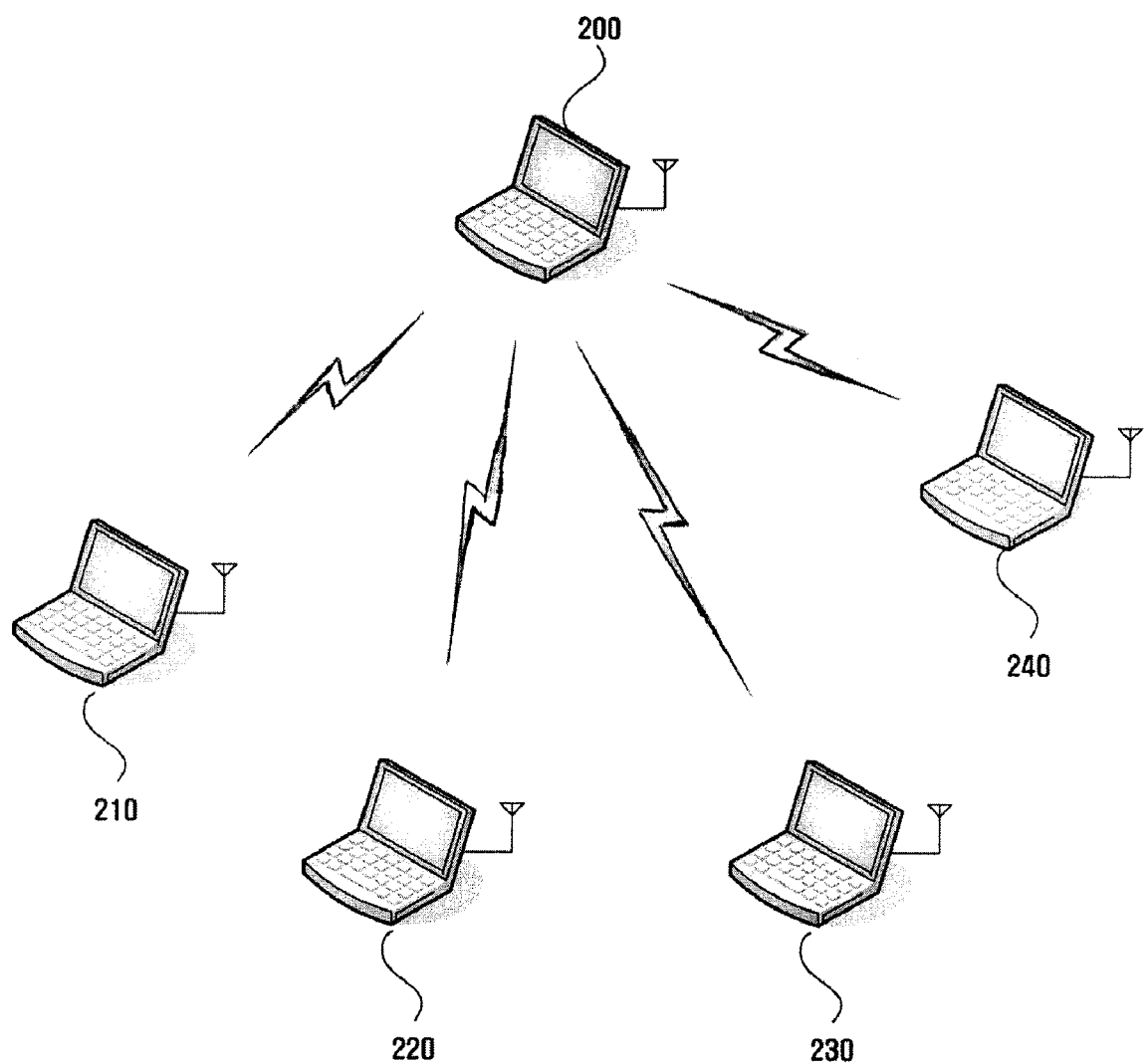
FIG. 2 illustrates a wireless network system according to an exemplary embodiment of the present invention.

FIG. 2 is a schematic diagram of a wireless network system according to an embodiment of the present invention. Referring to FIG. 2, the wireless network system includes a wireless network coordinator 200 and wireless network stations 210, 220, 230 and 240.

The wireless network coordinator 200 is a station having network management rights, and transmits a beacon frame for coordinating bandwidth allocation for one or more wireless network stations 210, 220, 230, and 240. That is, based on the beacon frame transmitted from the wireless network coordinator 200, the one or more wireless network stations 210, 220, 230, and 240 constituting the network determines whether to wait for bandwidth allocation if bandwidth allocation is not made, or to transmit data to other station(s) through an allocated bandwidth if bandwidth allocation is made.

The network according to an embodiment of the present invention is based on a superframe including at least one channel time block. The at least one channel time block is divided into a reserved channel time block in which a particular station on the network is allowed for bandwidth allocation and an unreserved channel time block in which one selected among stations on the network through contention is allowed for bandwidth allocation. Here, the at least one time block is a given time period during which data is transmitted between stations existing on the network. The reserved channel time block and the unreserved channel time block correspond to a CTAP and a CAP, respectively.

A station including data to be transmitted may transmit the data through contention with other stations in the unreserved channel time block, or may transmit the data in the reserved channel time block assigned to the station.

Here, a communication channel for transmitting or receiving the beacon frame, or a communication channel for the unreserved channel time block uses a frequency of 2.4 GHz or 5 GHz. A communication channel for the reserved channel time block uses a frequency of 60 GHz.

The wireless network stations 210, 220, 230, and 240 may transmit or receive data through contention in the unreserved channel time block or may transmit a packet requesting bandwidth allocation in the reserved channel time block (hereinafter referred to as a "bandwidth-allocation-request packet"). A station newly participating in the network may transmit a packet requesting participation in the network (hereinafter referred to as a "participation-request packet"). The wireless network coordinator 200 having received the request packet, such as the bandwidth-allocation-request packet or the participation-request packet, performs scheduling for the at least one time block of the superframe, and transmits a beacon frame including scheduling information.

That is, the beacon frame contains reservation information about at least one reserved channel time blocks and reservation information about at least one unreserved channel time blocks. The wireless network stations 210, 220, 230, and 240 determines positions of the reserved channel time block and the unreserved channel time block contained in the superframe based on the reservation information included in the received beacon frame, and may then transmit or receive data in the corresponding channel time block or transmit or receive the request packet.

It is sometimes necessary to process predetermined data ahead of other data due to the properties of the predetermined data. A station (hereinafter referred to as a "receiving station") which receives and then processes data may delay the processing of data of importance by processing a plurality of data in the order received. For example, if the receiving station receives multimedia content and delays the processing of audio and video data, the receiving station may not be able to seamlessly reproduce the received multimedia content.

In order to address this problem, a station (hereinafter referred to as a "transmitting station") which transmits data may set the priorities among a plurality of data according to the types and the properties of the plurality of data, and then transmit a packet that includes the plurality of data and that specifies the priorities among the plurality of data.

Then, the receiving station analyzes the packet transmitted by the transmitting station, identifies the priorities among the plurality of data, and processes the plurality of data according to the identified priorities.

Figure 3:
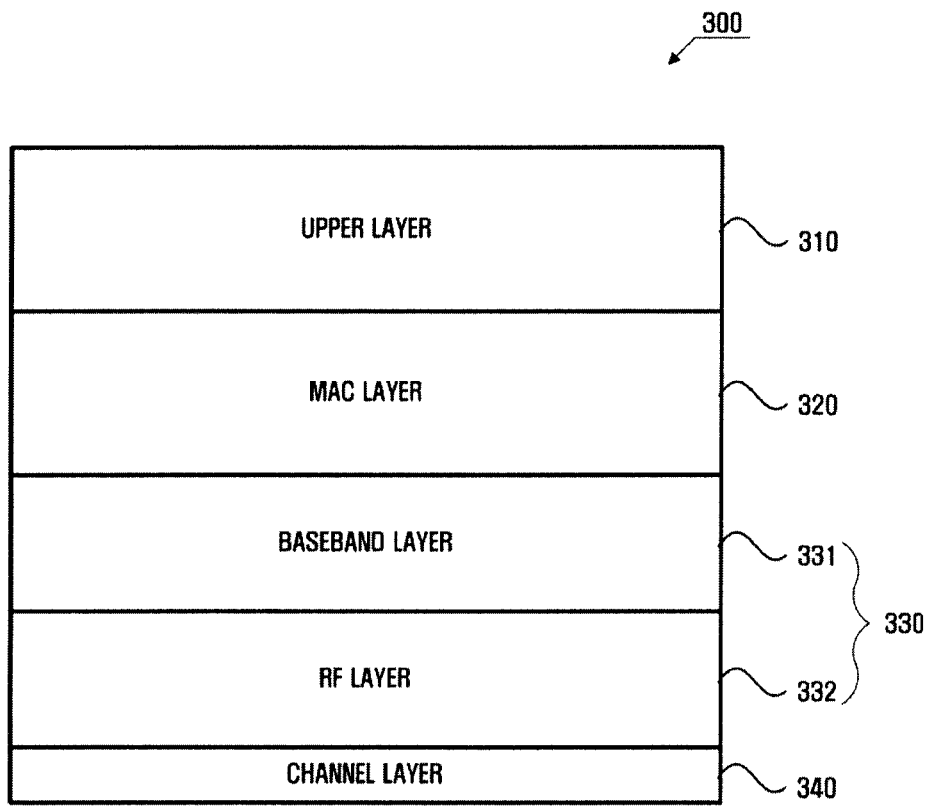
FIG. 3 illustrates a communication hierarchy according to an exemplary embodiment of the present invention.

FIG. 3 illustrates a communication layer format according to an embodiment of the present invention. In general, a communication layer 300 includes a channel layer 340 as a physical medium of a predetermined frequency width through which RF signals are transmitted as the lowermost layer, a Physical (PHY) layer 330 consisting of a Radio Frequency (RF) layer 332 and a baseband layer 331, an MAC layer 320, and an upper layer 310. The upper layer 31 includes layers disposed over the MAC layer 320, consisting of a Logical Link Control (LLC) layer, a network layer, a transmission layer, and an application layer.

In the RF channel according to an exemplary embodiment of the present invention, not only low-frequency, such as 2.4 GHz or 5 GHz, but also a high-frequency, such as 60 GHz. Accordingly, the channel layer 340 can perform not only omni-directional communications but also unidirectional communications.

Figure 4:
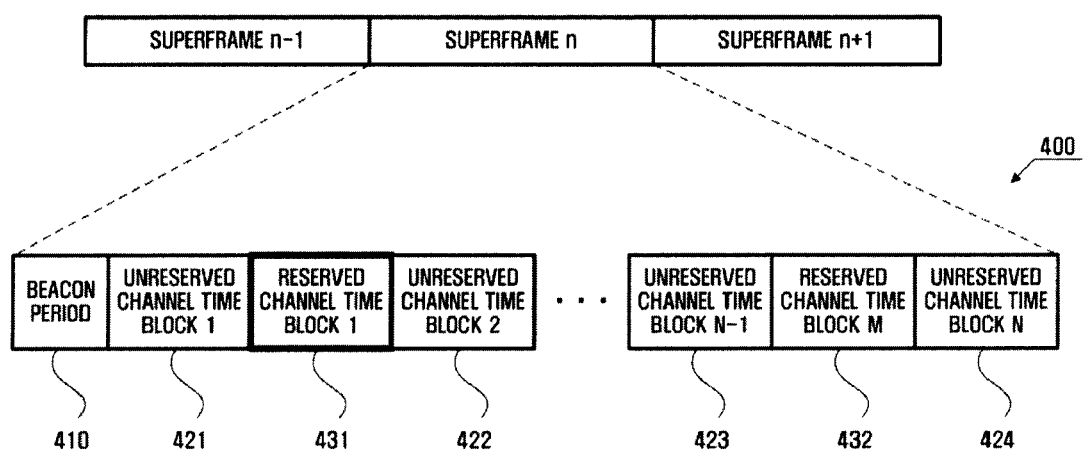
FIG. 4 illustrates a super frame according to an exemplary embodiment of the present invention.

FIG. 4 illustrates the structure of a superframe according to an embodiment of the present invention. Referring to FIG. 4, the superframe 400 includes a beacon period 410, unreserved channel time blocks 421, 422, 423, and 424, and reserved channel time blocks 431 and 432.

During the beacon period 410, a beacon frame is distributed by the wireless network coordinator 200, so that the stations 210, 220, 230, and 240 having received the beacon frame transmit or receive data based on reservation information contained in the beacon frame, or transmit a bandwidth-allocation-request packet through contention with other stations.

In the unreserved channel time blocks 421, 422, 423, and 424, two or more stations attempting to transmit data contend with each other. Only the station selected in the contention can transmit data through an allocated bandwidth.

In the reserved channel time blocks 431 and 432, a bandwidth is allocated to a particular station, so that the particular station can transmit data through the allocated bandwidth.

In order to notify the stations 210, 220, 230 and 240 on the network of reservation information about the reserved channel time blocks and unreserved channel time block, the beacon frame may contain information elements, including a first information element containing reservation information about reserved channel time blocks, and a second information element containing reservation information about unreserved channel time blocks.

Figure 5:
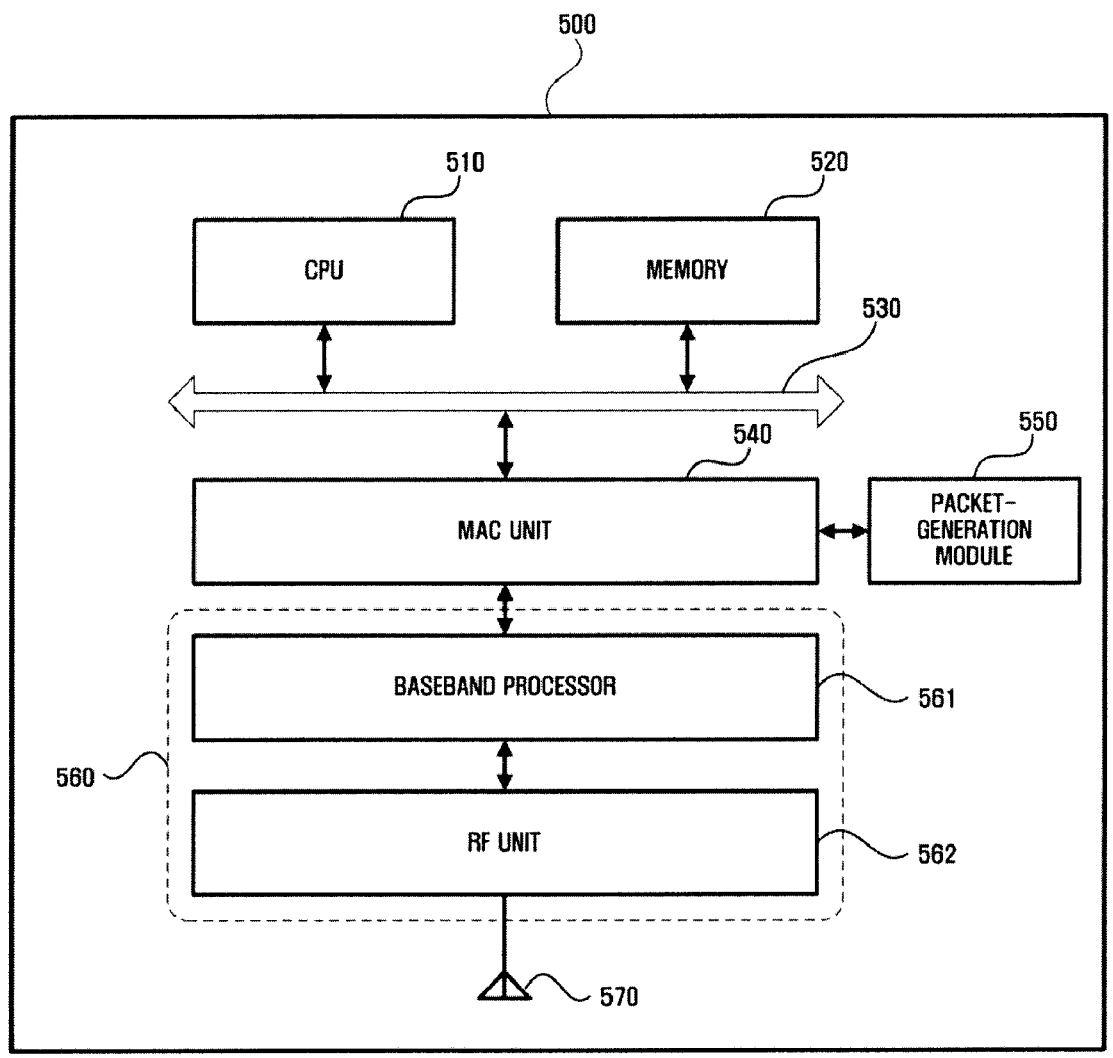
FIG. 5 illustrates a block diagram of an apparatus for transmitting data, according to an exemplary embodiment of the present invention.

FIG. 5 illustrates a block diagram of an apparatus for transmitting data, according to an exemplary embodiment of the present invention, more particularly, a transmitting station 500. Referring to FIG. 5, the transmitting station 500 includes a CPU 510, a memory 520, an MAC unit 540, a packet-generation module 550 and a communication module 560.

The CPU 510 controls one or more elements connected to a bus 530. The CPU 510 serves the operations of the upper layer illustrated in FIG. 3. More specifically, the CPU 510 processes received data (i.e., a received MAC service data unit (MSDU)) provided by the MAC unit 540, or generates data to be transmitted (i.e., an MSDU to be transmitted) and provides the generated data to the MAC unit 540.

The memory 520 stores data. The memory 520 is a module such as a hard disc, an optical disc, a flash memory, a compact flash (CF) card, a secure digital (SD) card, a smart media (SM) card, a multimedia card (MMC) or a memory stick to and from which data can be input/output. The memory 520 may be included in the transmitting station 500 or in an external device.

The packet-generation module 550 adds an MAC header to an MSDU provided by the CPU 510, i.e., to data to be transmitted, thereby generating an MAC-protocol data unit (MPDU). The packet-generation module 550 may also generate a packet that specifies priorities among a plurality of data.

The priorities among a plurality of data may be set according to the types and the properties of the plurality of data. For example, the plurality of data may include audio data, video data, Internet data and a combination thereof. Different priority levels may be assigned to different types of data, and the different types of data may be included in a packet. Internet data may include FTP or HTTP data.

Given that it is generally preferable to process multimedia content before Internet data, the packet-generation module 550 may set the priorities among a plurality of data so that the processing of audio data, video data or a combination of audio data and video data has priority over the processing of Internet data. Accordingly, a receiving station may process multimedia content ahead of other types of data.

The audio and video data may have different priorities. Because delays in audio data can be more easily recognized by a user than delays in video data, the packet-generation module 550 may set the priorities of the audio and video data so that the processing of audio data has priority over the processing of video data. Accordingly, a receiving station may process audio data ahead of other types of data.

Data can be transmitted and received using an isochronous or asynchronous method. Multimedia data is generally transmitted and received isochronously, and Internet data is generally transmitted and received asynchronously. The packet-generation module 550 may set the priorities for the data so that the processing of isochronous data has priority over the processing of asynchronous data.

The packet-generation module 550 is illustrated in FIG. 5 as being separate from the MAC unit 540. However, the packet-generation module 550 may be included in the MAC unit 540.

The communication module 560 converts a packet generated by the packet-generation module 550 into a wireless signal and transmits the wireless signal through a predetermined communication channel. Here, the communication module 560 includes a baseband processor 561 and an RF unit 562, and is connected to an antenna 570. The antenna 570 can transmit/receive a high-frequency wireless signal with directivity.

The baseband processor 561 is provided with an MPDU generated by the packet-generation module 550, and adds a signal field and a preamble to the MPDU, thereby generating a PHY protocol data unit (PPDU). Then, the RF unit 562 converts the PPDU into a wireless signal and transmits the wireless signal through the antenna 570.

The communication module 560 may set a frequency band of a communication channel established by the RF unit 562 to 2.5 GHz, 5 GHz or 60 GHz. In addition, the communication module 560 may set the directivity of the antenna 570.

The packet-generation module 550 generates a frequency-band-allocation request packet. The frequency-band-allocation request packet may be transmitted to a wireless network coordinator 200, and the wireless network coordinator 200 may transmit a frequency-band-allocation authorization packet.

The communication module 560 may transmit a frequency-band-allocation request packet during an unreserved channel time-block which is part of a super frame. More specifically, the communication module 560 may contend with other stations during an unreserved channel time-block in order to transmit/receive a frequency band allocation packet. In this case, the communication module 560 may use a CSMA/CS method or a slotted aloha method.

Figure 6:
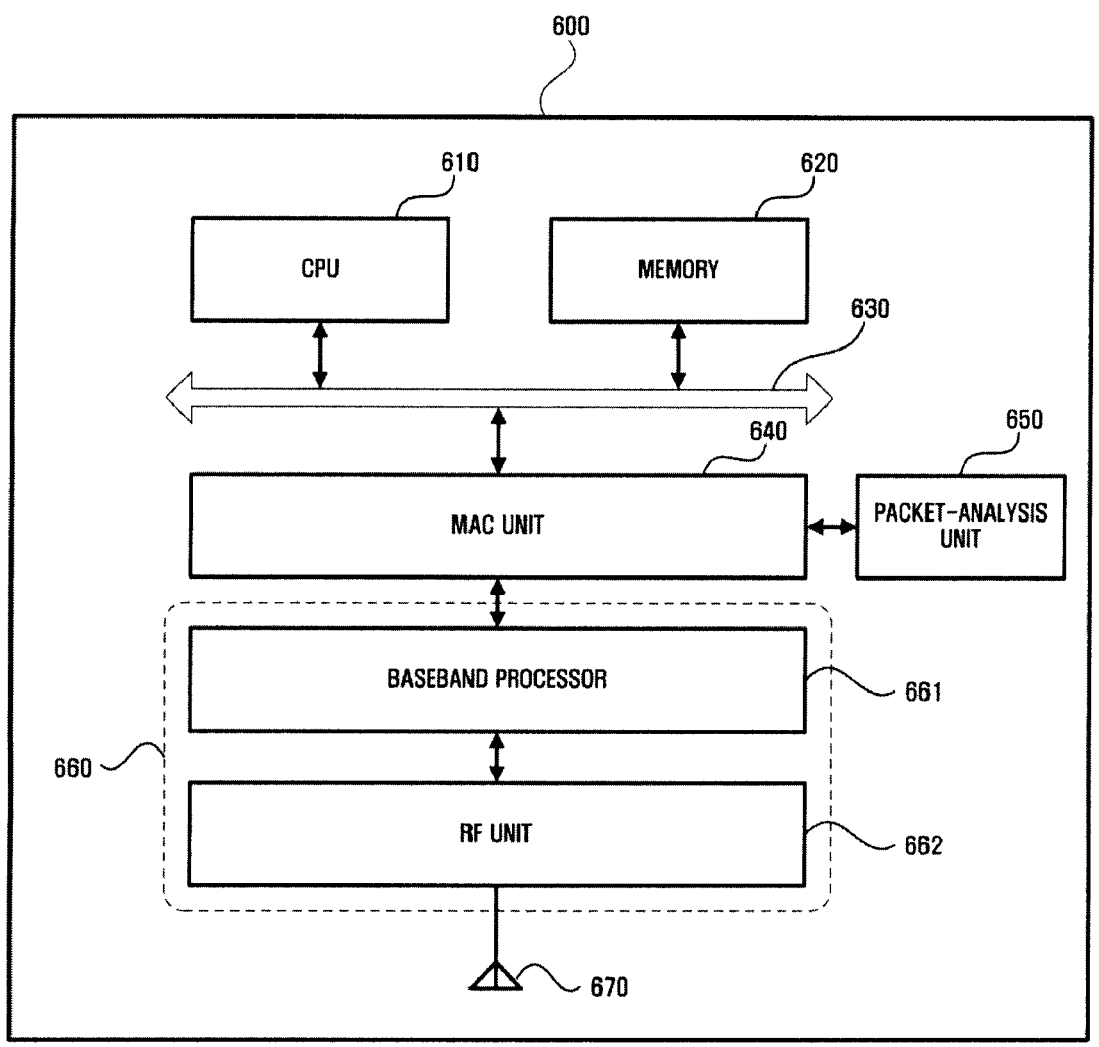
FIG. 6 illustrates a block diagram of an apparatus for receiving data, according to an exemplary embodiment of the present invention.

FIG. 6 illustrates an apparatus for receiving data, according to an exemplary embodiment of the present invention, more particularly, a receiving station 600. Referring to FIG. 6, the receiving station 600 includes a CPU 610, a memory 620, an MAC unit 640, a packet-analysis module 650, and a communication module 660.

The communication module 660 receives a packet transmitted by the transmitting station 500 through a predetermined communication channel. The communication channel includes a 60 GHz communication channel. The communication module 660 includes a baseband processor 661 and an RF unit 662, and is connected to an antenna 670. The antenna 670 may transmit/receive a high-frequency wireless signal with directivity.

The MAC unit 640 extracts an MSDU by separating the MAC header from the packet received by the communication module 660. Then, the MAC unit 640 transmits the MSDU to the CPU 610. The MAC unit 640 may command the packet-analysis module 650 to analyze the MAC header. The packet-analysis module 650 may identify priorities among a plurality of data included in the packet received by the communication module 660 by analyzing the MAC header. The plurality of data included in the packet received by the communication module 660 may include audio data, video data, Internet data and a combination thereof. And, the plurality of data can be received isochronously or asynchronously.

The CPU 610 controls one or more elements which are connected to a bus 630. The CPU 610 serves the operations of the upper layer illustrated in FIG. 3. More specifically, the CPU 610 processes received data (i.e., received MSDU) provided by the MAC unit 640, or generates data to be transmitted (i.e., MSDU to be transmitted) and provides the generated data to the MAC unit 640.

The CPU 610 may process a plurality of data according to priorities among the plurality of data. More specifically, the CPU 610 may process data with a high priority level and then process data with a low priority level.

The memory 620 stores data. The memory 620 is a module such as a hard disc, an optical disc, a flash memory, a CF card, an SD card, an SM card, an MMC or a memory stick to/from which data can be input/output. The memory 620 may be included in the transmitting station 500 or in an external device.

The packet-analysis module 650 is illustrated in FIG. 6 as being separate from the MAC unit 640. However, the packet-analysis module 650 may be included in the MAC unit 640.

Figures 7, 8:
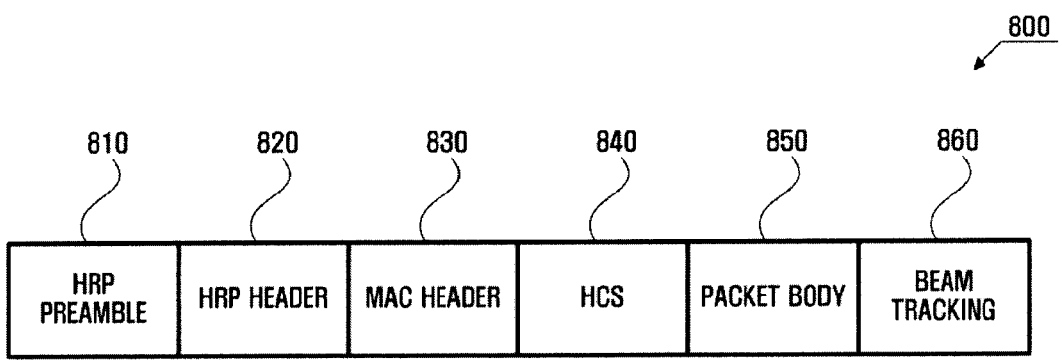
FIG. 7 illustrates a high rate PHY (HRP) mode table 700 showing data-transmission rates for different HRP modes, according to an exemplary embodiment of the present invention.
FIG. 8 illustrates a high Rate PHY protocol data unit (HR-PDU) packet, according to an exemplary embodiment of the present invention.

FIG. 7 illustrates a high rate PHY (HRP) mode table 700 showing data-transmission rates for different HRP modes, according to an exemplary embodiment of the present invention. According to an exemplary embodiment of the present invention, various transmission modes which support different signal processing methods, i.e., various HRP modes, may be provided. The various HRP modes may be different from one another in terms of at least one of coding mode, modulation method, and/or data-transmission rate.

According to an exemplary embodiment of the present invention, an equal error protection (EEP) mode and an unequal error protection (UEP) mode may be provided as coding modes. The EEP mode is a coding mode in which the same code rates are applied to each bit of data to be transmitted, and the UEP mode is a coding mode in which two or more code rates are applied to data to be transmitted.

For example, each sub-pixel of an eight-bit video image may be represented by eight bits. Referring to the eight bits, a highest-order bit is referred to as a most significant bit (MSB), and a lowest-order bit is referred to as a least significant bit (LSB).

That is, eight bits of one-byte data may be different from one another in terms of importance to the restoration of an image signal. Thus, it is more difficult to restore an image signal when important bits, i.e., MSBs, are erroneous than when less important bits, i.e., LSBs, are erroneous.

Therefore, it is preferable to apply lower code rates to MSBs than to LSBs in terms of enhancing the effect of error correction for MSBs. For this, the UEP mode may be used.

Referring to FIG. 7, HRP mode indexes are the identifiers of HRP modes. The EPP mode is used for HRP modes 0 through 2, and the UEP mode is used for HRP modes 3 and 4.

In the ULEP mode, a code rate of 4/7 is applied to MSBs, and a code rate of 4/5 is applied to LSBs. That is, in the UEP mode, a code rate applied to MSBs is lower than a code rate applied to LSBs. In this case, the effect of error correction for MSBs can be enhanced compared to the effect of error correction for LSBs.

HRP modes 5 and 6 are HRP modes for use in the retransmission of data when there is a transmission error. In HRP modes 5 and 6, MSBs may be retransmitted using a code rate of 1/3, and LSBs may not necessarily be retransmitted. However, HRP modes, other than HRP modes 5 and 6, may also be used to retransmit data.

Referring to FIG. 7, HRP modes 0 through 6 may use different modulation methods such as Quadrature Phase-Shift Keying (QPSK) and 16-Quadrature Amplitude Modulation (QAM). Also, HRP modes 0 through 6 may offer different data-transmission rates.

HRP modes 0 through 6 illustrated in FIG. 7 are exemplary, and thus, the present invention is not restricted thereto. Various HRP modes, other than HRP modes 0 through 6, may be generated using various coding modes, various code rates, and various modulation methods.

The HRP mode table 700 illustrated in FIG. 7 may be shared between a number of devices in a wireless network. For example, the HRP mode table 700 may be stored in a device during the manufacture of the device or may be input to the device through a predetermined communication route after the manufacture of the device. According to an exemplary embodiment of the present invention, various low rate PHY (LRP) modes may be provided.

FIG. 8 illustrates an HRP protocol data unit (HRPDU) packet 800, according to an exemplary embodiment of the present invention. Packets may be transmitted between the transmitting station 600 and the receiving station 600 in an HRP mode. The packets transmitted between the transmitting station 600 and the receiving station 600 in an HRP mode may be referred to as HRPDU packets. Referring to FIG. 8, the HRPDU packet 800 includes an HRP preamble field 810, an HRP header field 820, an MAC header field 830, a Header Check Sum (HCS) field 840, a packet body field 850, and a beam tracking field 860.

The HRP preamble field 810 is used for synchronization with a receiving station. More specifically, the HRP preamble field 810 may be used for a receiving station to perform auto gain control, phase estimation/update and channel estimation/update.

Figure 9:
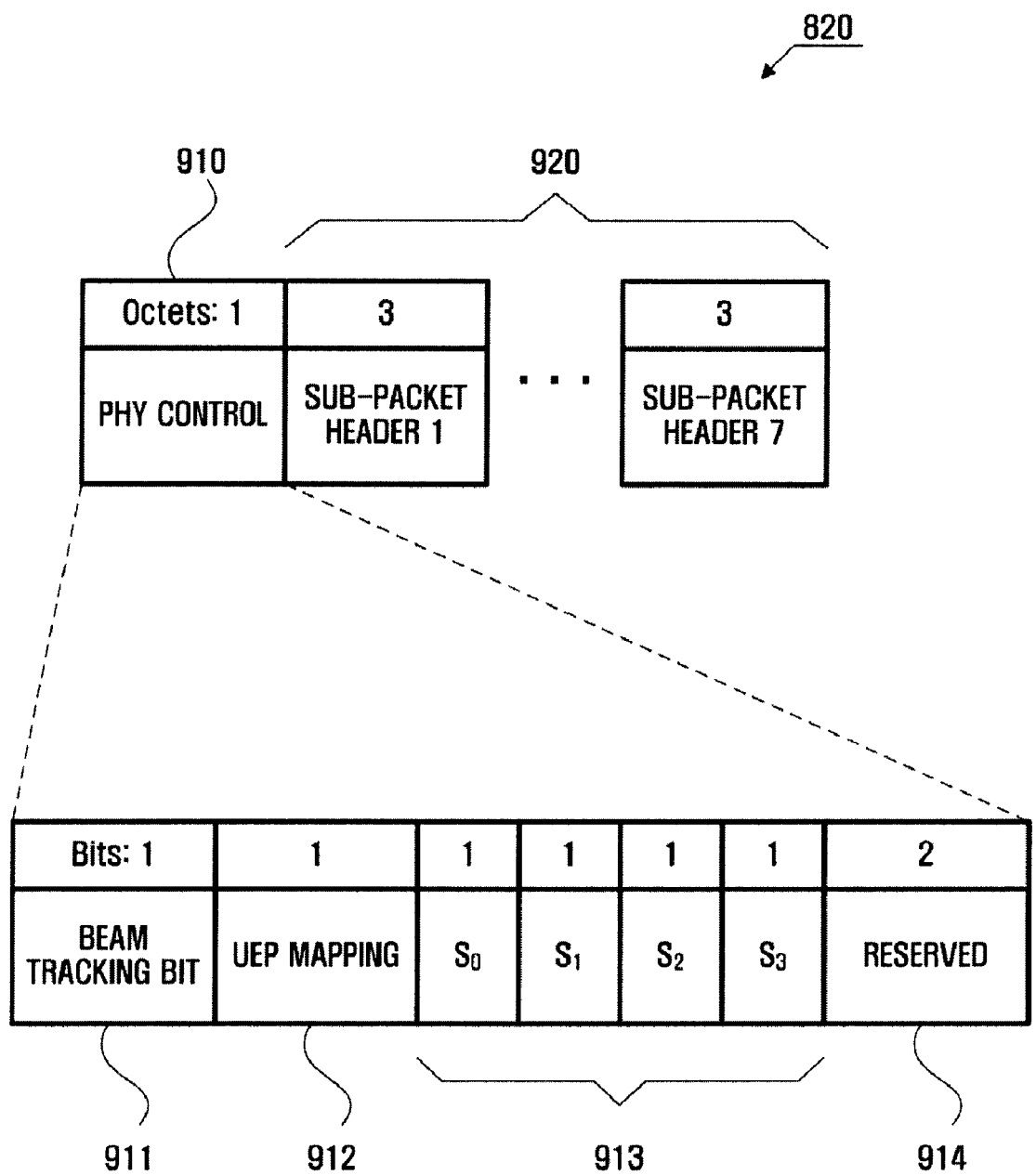
FIG. 9 illustrates the format of an HRP header field illustrated in FIG. 8.

The format of HRP header field 820 is illustrated in FIG. 9. The HRP header field 820 includes a PHY control field 910 and a sub-packet header field 920. Here, the PHY control field 910 includes a beam tracking bit field 911, an UEP mapping field 912, a scrambler initialization seed field 913 and a reserved field 914.

The beam tracking bit shall be set to one if the packet has a beam tracking field appended to the packet. It shall be set to zero otherwise.

The UEP mapping bit shall be set to one if the UEP modes that are used in the sub-packets will use the UEP mapping mode. It shall be set to zero if the UEP modes in the sub-packets will use the UEP coding mode.

The packet body 850 shall be scrambled with a length 32627 scrambler. The scrambler shall use the generator polynomial P(x) which is defined as P(x)=x15+x14+1.

The initial value of scrambler shall be set by the four variable seeds, S0, S1, S2 and S3, and 11 fixed seeds. All fields in the HRP header 820, the MAC header 830 and the HCS 840 shall be scrambled as with the variable seeds set to S0=0, S1=1, S2=0, S3=1. The entire data stream following the HCS 840, including the stuff bits, is scrambled using the seed bits specified in the PHY control field 910.

The reserved field 914 of the PHY control field 910 may be used for unspecified future purposes.

The sub-packet header field 920 of HRP header field 820 includes an HRP mode index field and a length field. The HRP mode index field shall be set to the HRP mode that will be used for that sub-packet. The indices for modes 0-6 are defined in FIG. 7, all other values shall be reserved.

The length field contains the length, in octets, of the sub-packet.

Figure 10:
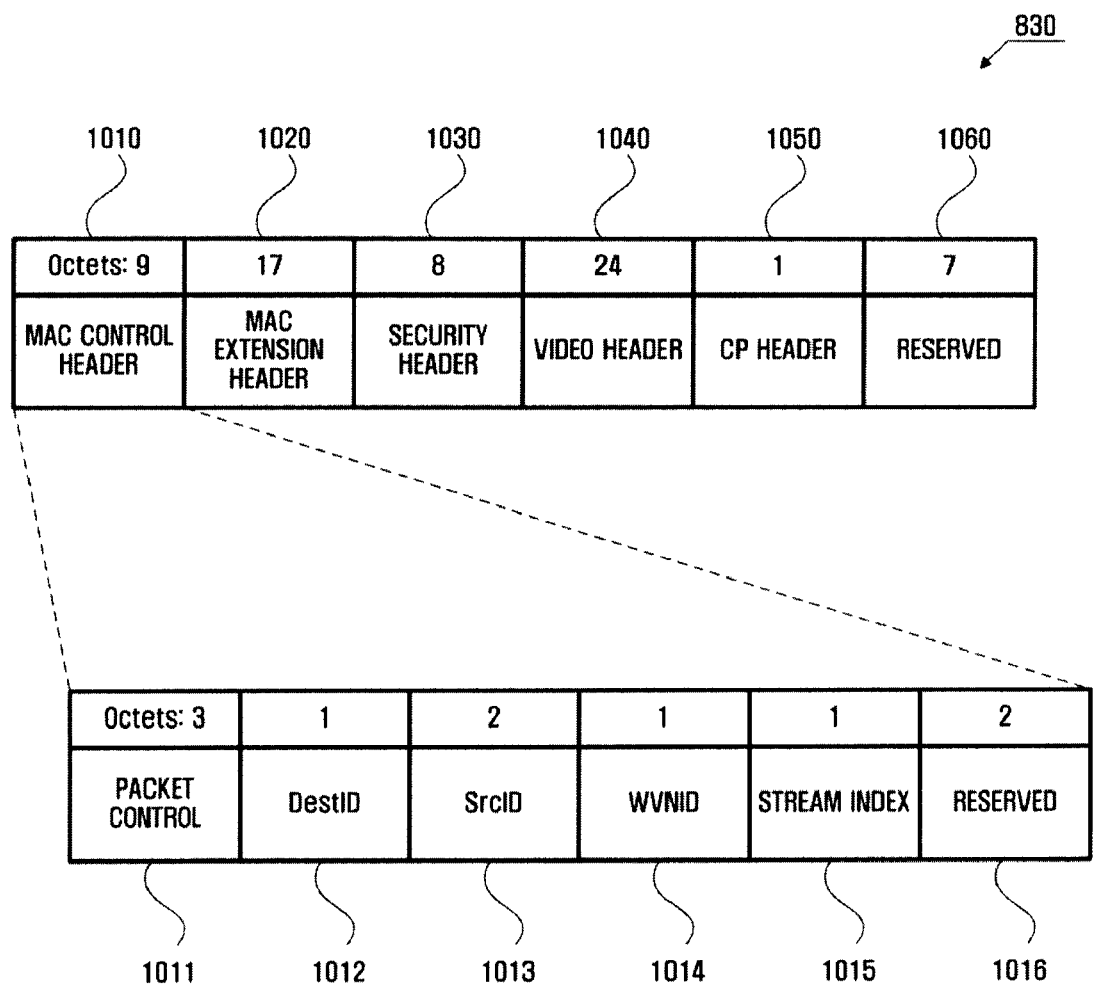
FIG. 10 illustrates the format of a media access control (MAC) header field illustrated in FIG. 8.
Figure 11:
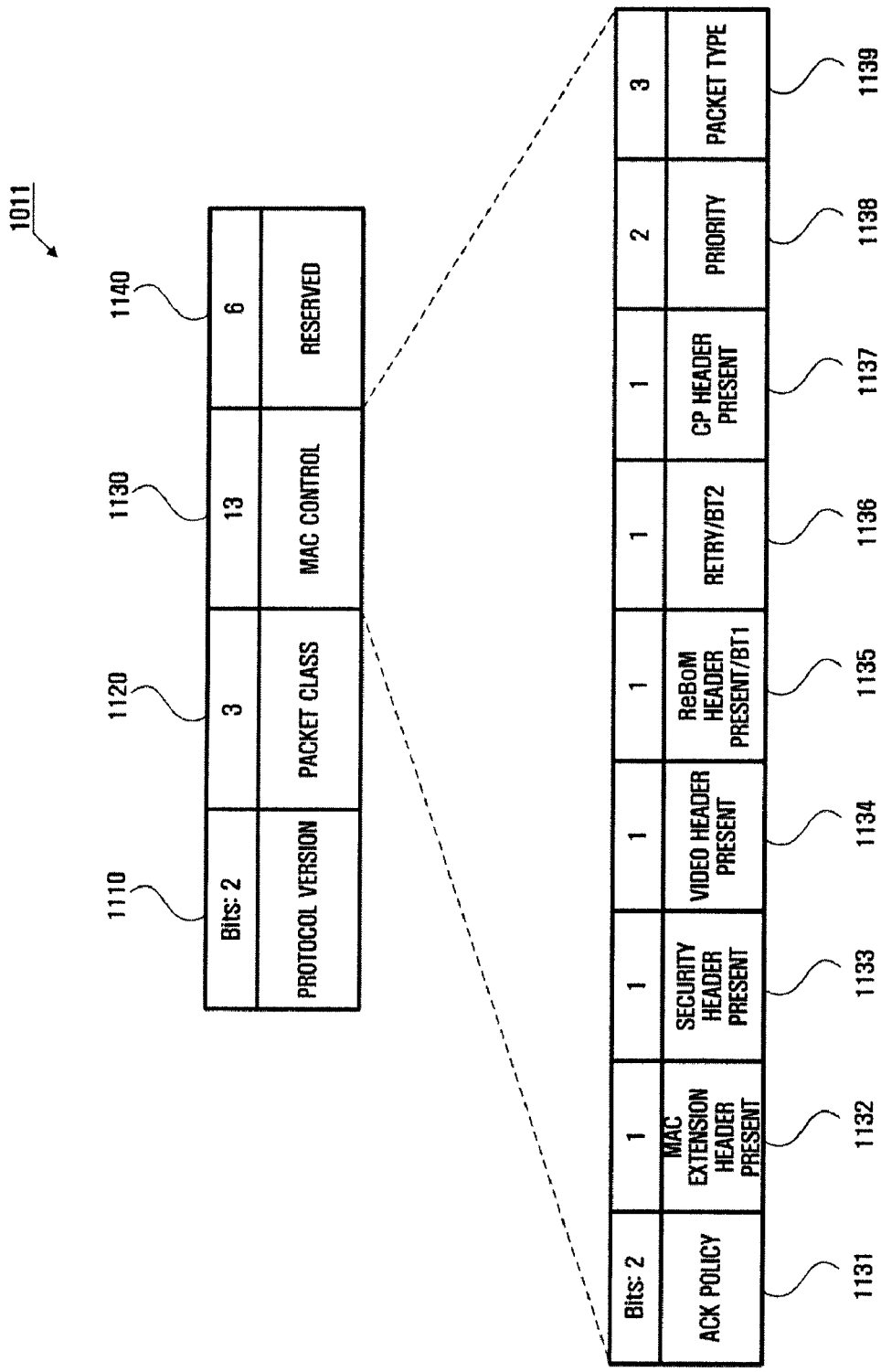
FIG. 11 illustrates the format of a packet control field illustrated in FIG. 10.

FIG. 10 illustrates the format of an MAC header field illustrated in FIG. 8. The MAC header field 830 includes an MAC control header field 1010, an MAC extension header field 1020, a security header field 1030, a video header field 1040, a CP header field 1050 and a reserved field 1060.

Here, the MAC control header field 1010 includes a packet control field 1011, a DestID field 1012, a SrcID field 1013, a WVNID field 1014, a stream index field 1015 and a reserved field 1016. And here, the packet control field 1011 includes a protocol version field 1110, a packet class field 1120, an MAC control field 1130 and a reserved field 1140. The MAC control field 1130 includes an ACK policy field 1131, an MAC extension header present field 1132, a security header present field 1133, a video header present field 1134, a ReBoM header present/BT1 field 1135, a retry/BT2 field 1136, a CP header present field 1137, a priority field 1138 and a packet type field 1139.

The protocol version field 1110 indicates the revision of the protocol used for the packet.

The packet class field 1120 indicates the class of packet. Valid values of the packet class field 1120 are listed in the packet class table 1200 in FIG. 12.

The ACK policy field 1131 of the MAC control field 1130 indicates the policy of ACK. Valid values of the ACK policy field 1131 are listed in the ACK policy table 1300 in FIG. 13. For example, the ACK policy field 1131 shall be set to 0b00 in case restraining the transmission of ACK, and the ACK policy field 1131 shall be set to 0b01 in case permitting the transmission of ACK.

The Mac extension header present bit 1132, security header present bit 1133, video header present bit 1134 and CP header present bit 1137 indicate the presence of the indicated header in the MAC header 830. If the bit is set to one, the corresponding header shall be present. It shall be set to zero otherwise.

In case the packet class field 1120 is set to normal, the ReBoM header present field 1135 shall be set to one if the ReBoM header is present in the MAC header 830 and it shall be set to zero if the ReBoM header is not present. The ReBoM header present field 1135 shall be set to zero for all other packet classes.

In case the packet class field 1120 is set to normal, the retry field 1136 shall be set to one and the packet is a retransmission. In case the packet class field 1120 is set to composite, the retry field 1136 is used to signal beam tracking. It shall be set to zero otherwise.

That is, for composite packets, the BT1 and BT2 bits are used for beam tracking

The priority field 1138 indicates the processing priority of data. The packet body 850 includes video data, audio data and Internet data (FTP, HTTP, etc.). The priority field 1138 indicates the priorities among a plurality of data according to the types and the properties of the plurality of data. A receiving station may process the corresponding data according to the priority which is described in the priority field 1138. The audio data, the video data or a combination of the audio data and the video data can be compressed data or uncompressed. It is generally preferable to set the priority of the audio data, the video data or the combination higher than that of Internet data.

The processing priority specified in the priority field 1138 can be set according to the type of traffic. The processing of isochronous data has priority over the processing of asynchronous data.

The packet type field 1139 indicates the type of packet. The type of packet includes a control packet, a data packet, an audio packet and a Round Trip Time (RTT) packet.

The reserved field 1140 of the packet control field 1011 may be used for unspecified future purposes.

The DestID field 1012, the ScrID field 1013 and the WVNID field 1014 of the MAC control header field 1010 shall be set to the identifier of the destination, the identifier of the station that sends the packet and the identifier of the Wireless Video Area Network (WVAN) respectively.

The stream index field 1015 includes a stream index which is assigned by the wireless network coordinator 200, and the assigned stream index signifier the type of data which is assigned to be transmitted and received in the channel time blocks. The type of data includes an asynchronous data, MAC commands traffic, bandwidth reservation traffic, an unassigned stream and a quiet channel time block for current channel assessment.

The coordinator 200 allocates a unique stream index value for each stream in the WVAN.

The reserved field 1016 of the MAC control header field 1010 may be used for unspecified future purposes.

Figure 14:
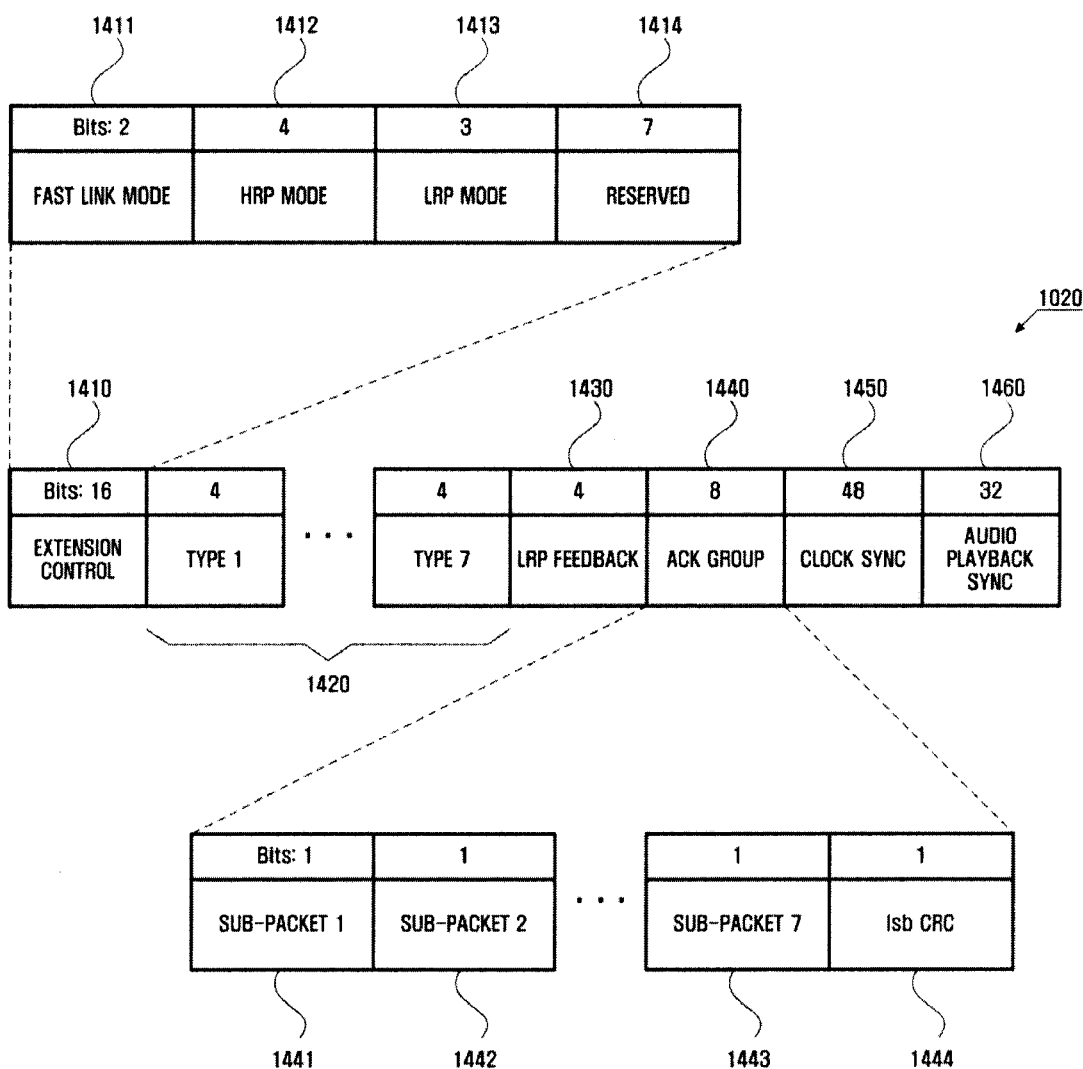
FIG. 14 illustrates the format of an MAC-extension-header field illustrated in FIG. 10.

FIG. 14 illustrates the format of an MAC extension header field illustrated in FIG. 10. The MAC extension header field 1020 includes an extension control field 1410, a plurality of type fields 1420, an LRP feedback field 1430, an ACK group field 1440, a clock sync field 1450 and an audio playback sync field 1460. Here, the extension control field 1410 includes a fast link mode field 1411, an HRP mode field 1412, an LRP mode field 1413 and a reserved field 1414.

The fast link mode field 1411 indicates the type of fast link recommendation that is carried in the packet. The type of the fast link includes a fast link recommendation is not being requested, a fast link recommendation request and a fast link recommendation response.

The HRP mode is used to indicate the recommended HRP mode to be used at the transmitter side. If the HRP mode field 1412 is set to 0b1111, then no changes to the current HRP mode is recommended.

The LRP mode is used to indicate the recommended LRP mode to be used at the transmitter side. If the LRP mode field 1413 is set to 0b111, then no changes to the current LRP mode is recommended.

The HRP mode field 1412 and the LRP mode field 1413 only have meaning when the fast link mode field 1411 is set to indicate fast link recommendation response.

The reserved field 1414 on the extension control field 1410 may be used for unspecified future purposes.

The type field 1420 indicates the type of data that is contained in the sub-packet. The type of data includes control, data, audio and video.

The LRP feedback field 1430 is used in the LRP directional mode to feed back the best pattern to use in future transmission.

The ACK group field 1440 includes a plurality of sub-packet fields 1441, 1442, 1443, and lsb CRC field 1444. The bit for a sub-packet fields 1441, 1442, 1443 shall be set to one if the sub-packet is in the same ACK group as the previous (i.e., lower numbered sub-packet). Otherwise, it is the first sub-packet in an ACK group and its bit shall be set to zero. The first bit, corresponding to the sub-packet field 1 1441, shall always be set to zero as it will always start an ACK group. No more than five ACK groups shall be defined, therefore, the number of bits set to zero among the sub-packet bits shall not exceed five.

The lsb CRC field 1444 shall be set to one if the lsb CRC is part of the calculation to determine if an ACK is sent. It shall be set to zero if the CRC for the lsbs is ignored in determining if an ACK will be sent. The setting of this field applies only to those sub-packets which are sent with an UEP HRP mode. For all other sub-packets, the lsb CRC field shall be set to zero.

The clock sync field 1450 of the MAC extension control field 1020 contains time stamp information to be used to synchronize the application level clocks among stations in the WVAN. The clock synchronization is used to synchronize a video clock and an audio clock among stations.

The audio playback sync field 1460 contains the playback time for the audio sub-packets contained in the packet.

Figure 15:
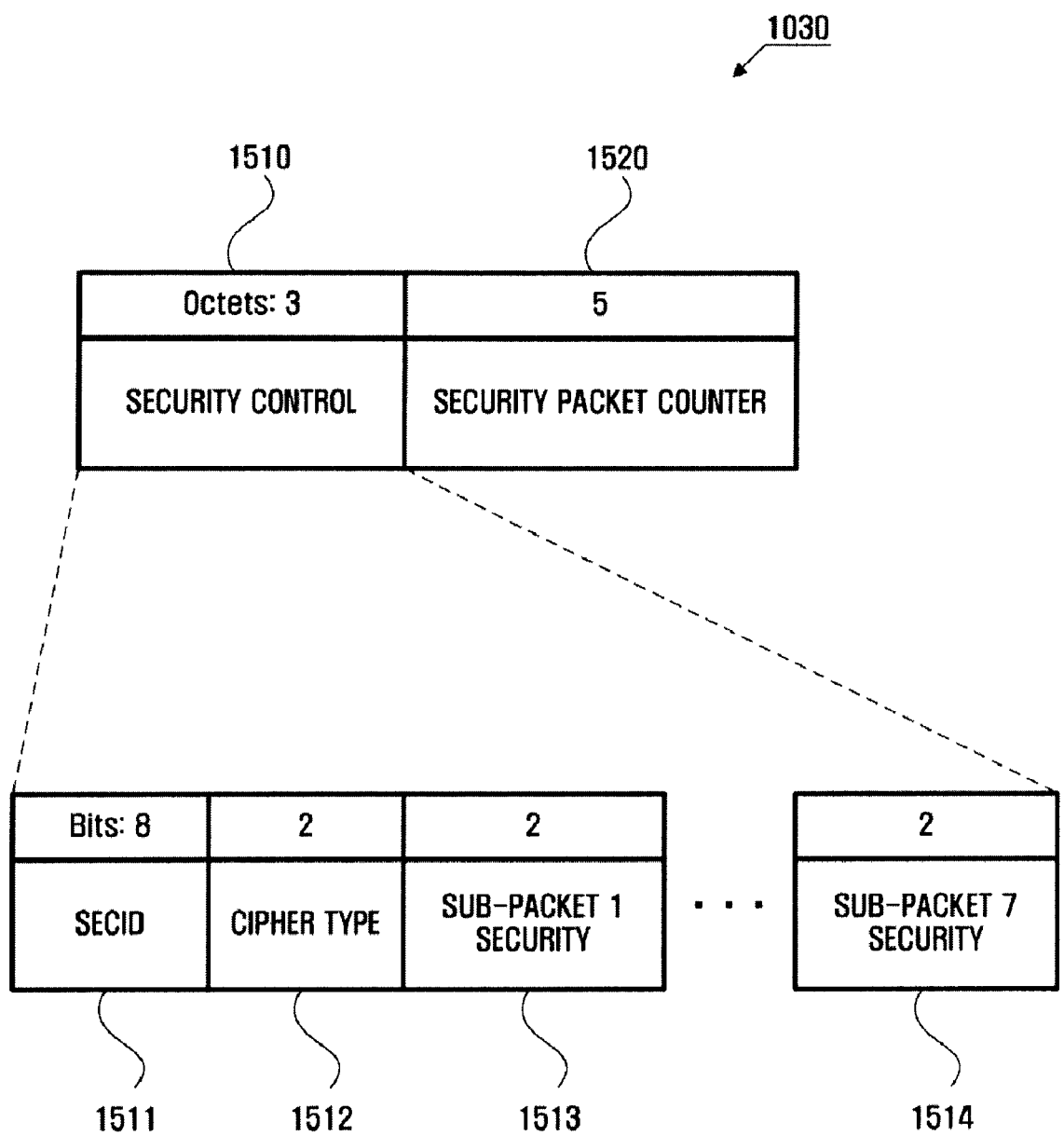
FIG. 15 illustrates the format of a security header field illustrated in FIG. 10.

FIG. 15 illustrates the format of a security header field illustrated in FIG. 10. The security header field 1030 includes a security control field 1510 and a security packet counter field 1520. The security control field 1510 includes an SECID field 1511, a cipher type field 1512 and a plurality of sub-packet security fields 1513, 1514.

The SECID field 1511 is used to identify the key that is used to encrypt the data in the packet.

The cipher type field 1512 indicates the cipher suite that is used for the packet. The cipher suite includes an Advanced Encryption Standard 128 Combined Cipher Machine (AES128 CCM).

The sub-packet security fields 1513, 1514 indicates the type of security that is applied to a sub-packet. The type of security includes no security applied, integrity code only and, encryption and integrity code.

The security packet counter field 1520 of the security header field 1030 is used to guarantee freshness and prevent replay attacks. Whenever a new key is generated, the secure packet counter shall be set to zero. The secure packet counter shall be incremented by number of sub-packets in each secure packet. Within a packet, the secure packet counter is incremented for each subsequent sub-packet after the first sub-packet in the packet, even for sub-packets that have no security applied.

Figure 16:
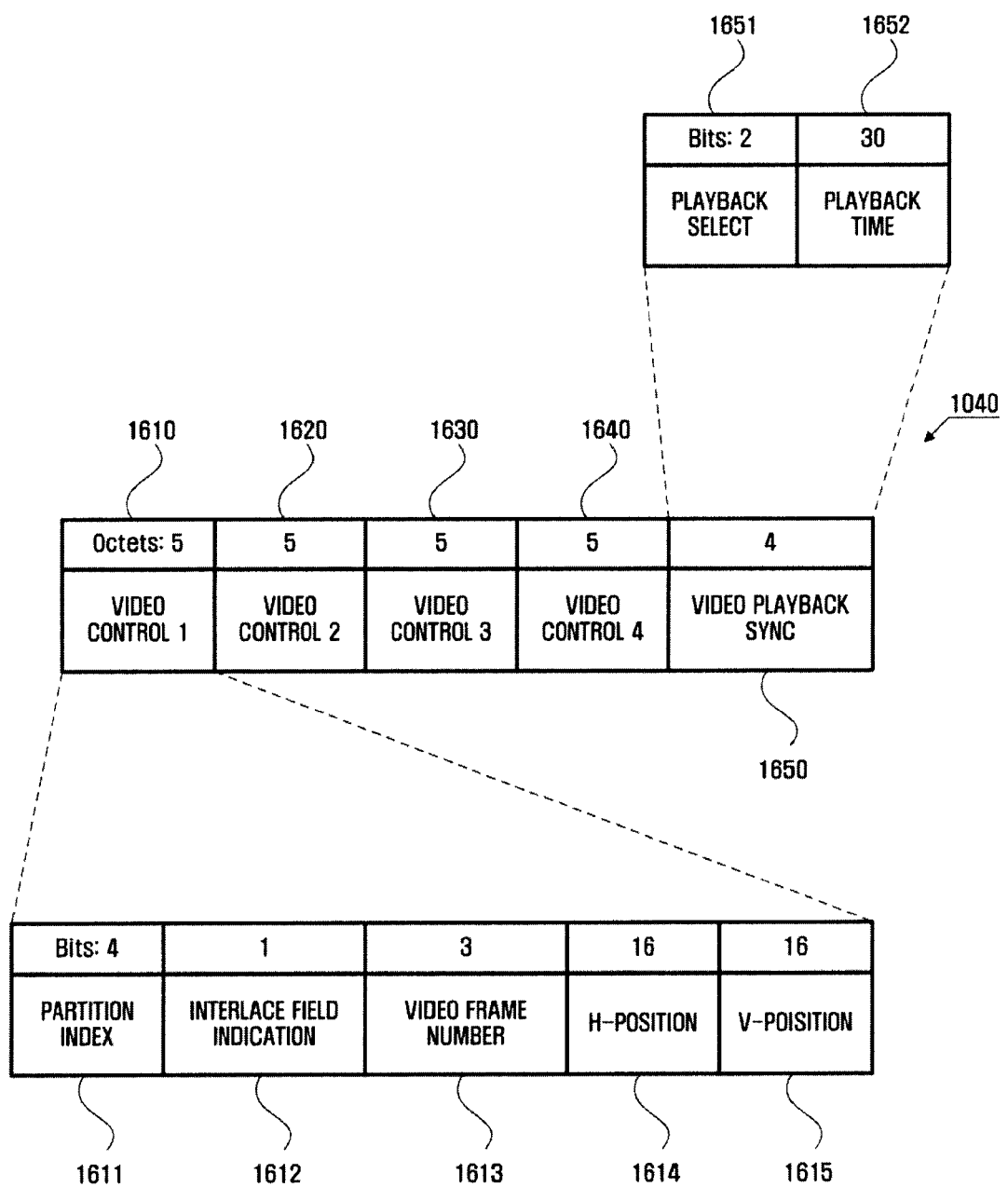
FIG. 16 illustrates the format of a video header field illustrated in FIG. 10.

FIG. 16 illustrates the format of a video header field illustrated in FIG. 10. The video header field 1040 includes a video control field 1610, 1620, 1630, 1640 and a video playback sync field 1650.

If fewer than four video sub-packets are present in the current packet, the unused video control fields shall be set to zero.

The video control field 1610 includes a partition index field 1611, an interlace field indication field 1612, a video frame number field 1613, an H-position field 1614, a V-position field 1615.

The partition index field 1611 indicates the partition to which the pixels in the sub-packet belong. The support of more than one partition is optional. If one or more types of partitions are supported, the 2 by 2 partition mode shall be supported.

The interlace field indication field 1612 shall be set to one if the video sub-packets carry pixels for the bottom field. It shall be set to zero if the video sub-packets carry pixels for the top field and for non-interlaced video modes.

The video frame number field 1613 contains a counter that keeps track of the video frame to which the pixels in the sub-packet belong. The video frame number is calculated follows.

For progressive video, the video frame number field 1613 shall be incremented sequentially. After reaching the max value of 0xF, the next value shall be zero. All packets belonging to the same video frame will have identical video frame number value.

For interlaced video, the video frame number field 1613 shall be incremented in a step of two. Thus, each video frame will have two frame numbers. All packets belonging to the first field will have even video frame number and all packets belonging to the second field will have odd video frame number. For example, for the first uncompressed video frame, the packets belonging to the first field will have a video frame number set to zero, and the packets belonging to the second field will have a video frame number set to one. Therefore, the same video frame has two video frame numbers.

The H-position field 1614 contains the horizontal position, prior to any pixel portioning, of the first pixel in the sub-packet where zero is on the left side of the screen.

The V-position field 1615 contains the vertical position prior to any pixel portioning, of the first pixel in the sub-packet where zero is corresponds to the top of the screen.

The video playback sync field 1650 of the video header field 1040 includes a playback select field 1651 and a playback time field 1652.

The playback select field 1651 indicates which of the four sub-packets to which the playback applies.

The playback time field 1652 specifies the time that the first active pixel of the frame specified in the selected video control header should begin playing.

The CP header field 1050 of the MAC header field 830 is used to convey content protection information for the packet. Its format is determined by the content protection method that is being used for the stream.

The reserved field 1060 of the MAC header field 830 may be used for unspecified future purposes.

The HCS field 840 of the HRPDU packet 800 shall be a 32-bit CRCs that is equivalent to the one defined in ANSI X3.66-1979 calculated over the PHY header and MAC header 830.

The generator polynomial for the HCS is given by:

$$G(x)=x32+x26+x23+x22+x16+x12+x11+x10+x8+x7+x5+x4+x2+x+1$$

The beam tracking field 860 contains information for adaptive beam forming.

Figure 17:
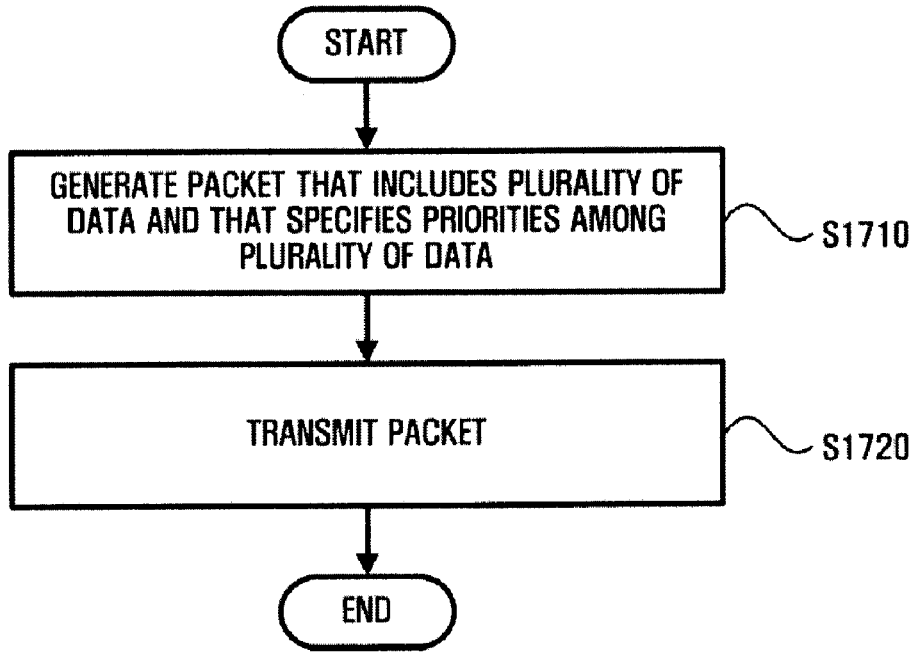
FIG. 17 illustrates a flowchart of a method of transmitting data, according to an exemplary embodiment of the present invention.

FIG. 17 illustrates a method of transmitting data, according to an exemplary embodiment of the present invention. Referring to FIG. 17, the packet-generation module 550 of the transmitting station 500 generates a packet including a plurality of data (operation S1710). The packet-generation module 550 may specify priorities among the plurality of data in the packet.

The plurality of data may include audio data, video data and Internet data. The packet-generation module 550 may set the priorities among the plurality of data so that the processing of audio data, video data or a combination of audio data and video data has priority over the processing of Internet data. The packet-generation module 550 may set the priorities of the audio and video data so that the processing of audio data has priority over the processing of video data.

Data can be transmitted and received using an isochronous or asynchronous method. Multimedia data is generally transmitted and received isochronously, and Internet data is generally transmitted and received asynchronously. The packet-generation module 550 may set the priorities for the data so that the processing of isochronous data has priority over the processing of asynchronous data.

The packet-generation module 550 transmits the generated packet to the communication module 560. Then, the communication module 560 transmits the generated packet (operation S1720). The communication module 560 may transmit the generated packet through a 2.4 GHz, 5 GHz, or 60 GHz communication channel during a reserved channel time-block which is part of a super frame and to which a frequency band is allocated.

Figure 18:
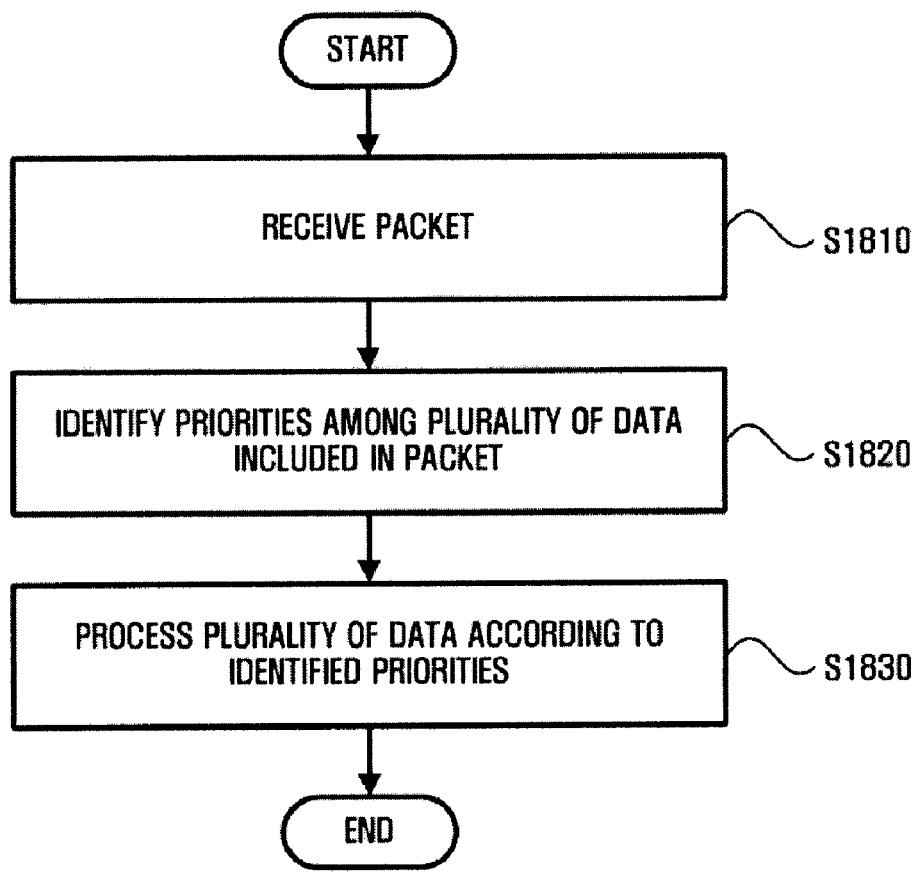
FIG. 18 illustrates a flowchart of a method of receiving data, according to an exemplary embodiment of the present invention.

FIG. 18 illustrates a flowchart of a method of receiving data, according to an exemplary embodiment of the present invention. Referring to FIG. 18, the communication module 660 of the receiving station 600 receives a packet from the transmitting station 500 (operation S1810).

Then, the communication module 660 transmits the received packet to the packet-analysis module 650 through the MAC unit 640. The packet-analysis module 650 identifies priorities among a plurality of data included in the received packet (operation S1820).

Thereafter, the packet-analysis module 650 transmits the plurality of data to the CPU 610. The CPU 610 processes the plurality of data according to the identified priorities (operation S1830). That is, the CPU 610 processes data with a high priority level ahead of data with a low priority level by temporarily delaying the data with the low priority level.

As described above, according to the exemplary embodiments of the present invention, a transmitting station sets priorities among a plurality of data to be transmitted, and a receiving station processes the plurality of data according to the set priorities. Therefore, it is possible to prevent delays in the processing of data.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for transmitting data, the apparatus comprising:
   a packet-generation module which generates a plurality of data and a packet, wherein the packet comprises the plurality of data and specifies processing priorities of the plurality of data in a MAC header of the packet; and
   a communication module which transmits the packet through a communication channel,
   wherein the packet further comprises a priority field indicating the processing priorities of the plurality of data in the MAC header of the packet;
   wherein the MAC header comprises a MAC control header field, which comprises a packet control field, which comprises a MAC control field, which comprises the priority field.

2. The apparatus of claim 1, wherein the plurality of data comprises at least one of audio data, video data, Internet data and a combination of the audio data, the video data, and the Internet data.

3. The apparatus of claim 2, wherein the Internet data comprises at least one of File Transfer Protocol data and Hypertext Transfer Protocol data.

4. The apparatus of claim 2, wherein the audio data, the video data or a combination of the audio data and the video data comprises compressed data.

5. The apparatus of claim 2, wherein the audio data, the video data or a combination of the audio data and the video data comprises uncompressed data.

6. The apparatus of claim 2, wherein a processing priority of the audio data, the video data or a combination of the audio data and the video data is higher than a processing priority of the Internet data, and the processing priority of the audio data is higher than the processing priority of the video data.

7. The apparatus of claim 1, wherein the plurality of data comprises isochronous data or asynchronous data, and a processing priority of the isochronous data is higher than a processing priority of the asynchronous data.

8. The apparatus of claim 1, wherein the communication module transmits the packet during a channel time-block which is part of a super frame and to which a frequency band is allocated, the super frame comprising at least one channel time-block.

9. An apparatus for receiving data, the apparatus comprising:
   a communication module which receives a packet through a communication channel;
   a packet-analysis module which identifies processing priorities of a plurality of data included in a MAC header of the packet; and
   a central processing unit (CPU) which processes the plurality of data according to the identified priorities,
   wherein the packet further comprises a priority field indicating the processing priorities of the plurality of data in the MAC header of the packet;
   wherein the MAC header comprises a MAC control header field, which comprises a packet control field, which comprises a MAC control field, which comprises the priority field.

10. The apparatus of claim 9, wherein the plurality of data comprises at least one of audio data, video data, Internet data and a combination of the audio data, the video data, and the Internet data.

11. The apparatus of claim 10, wherein a processing priority of the audio data, the video data and a combination of the audio data and the video data is higher than a processing priority of the Internet data.

12. The apparatus of claim 11, wherein the processing of the audio data is higher than the processing priority of the video data.

13. The apparatus of claim 9, wherein the plurality of data comprises isochronous data or asynchronous data, and a processing priority of the isochronous data is higher than a processing priority of the asynchronous data.

14. A method of transmitting data, the method comprising:
   generating a plurality of data and a packet, wherein the packet comprises the plurality of data and specifies processing priorities of the plurality of data in a MAC header of the packet; and
   transmitting the packet through a communication channel,
   wherein the packet further comprises a priority field indicating the processing priorities of the plurality of data in the MAC header of the packet;
   wherein the MAC header comprises a MAC control header field, which comprises a packet control field, which comprises a MAC control field, which comprises the priority field.

15. The method of claim 14, wherein the plurality of data comprises at least one of audio data, video data, Internet data and a combination of the audio data, the video data, and the Internet data.

16. The method of claim 15, wherein the Internet data comprises at least one of File Transfer Protocol and Hypertext Transfer Protocol data.

17. The method of claim 15, wherein the audio data, the video data or a combination of the audio data and the video data comprises compressed data.

18. The method of claim 15, wherein the audio data, the video data or a combination of the audio data and the video data comprises uncompressed data.

19. The method of claim 15, wherein a processing priority of the audio data, the video data or a combination of the audio data and the video data is higher than a processing priority of the Internet data, and the processing priority of the audio data is higher than the processing priority of the video data.

20. The method of claim 14, wherein the plurality of data comprises isochronous data or asynchronous data, and a processing priority of the isochronous data is higher than a processing priority of the asynchronous data.

21. The method of claim 14, wherein the transmitting of the packet comprises transmitting the packet during a channel time-block which is part of a super frame and to which a frequency band is allocated, the super frame comprising at least one channel time-block.

22. A method of receiving data, the method comprising:
receiving a packet through a communication channel;
identifying processing priorities among a plurality of data included in a MAC header of the packet; and
processing the plurality of data according to the processing priorities which are identified,
wherein the packet further comprises a priority field indicating the processing priorities of the plurality of data in the MAC header of the packet;
wherein the MAC header comprises a MAC control header field, which comprises a packet control field, which comprises a MAC control field, which comprises the priority field.

23. The method of claim 22, wherein the plurality of data comprises at least one of audio data, video data, Internet data and a combination of the audio data, the video data, and the Internet data.

24. The method of claim 23, wherein a processing of the audio data, the video data or a combination of the audio data and the video data has priority over a processing of the Internet data, and the processing priority of the audio data is higher than the processing priority of the video data.

25. The method of claim 22, wherein the plurality of data comprises isochronous data or asynchronous data , and a processing priority of the isochronous data is higher than a processing priority of the asynchronous data.

* * * * *